(12) United States Patent
Miyamoto et al.

(10) Patent No.: US 9,496,762 B2
(45) Date of Patent: Nov. 15, 2016

(54) MOTOR

(71) Applicant: NIDEC TECHNO MOTOR CORPORATION, Kyoto (JP)

(72) Inventors: Masataka Miyamoto, Kyoto (JP); Masayuki Ishikawa, Kyoto (JP); Akitoshi Maeno, Kyoto (JP); Takenori Kawashima, Kyoto (JP)

(73) Assignee: NIDEC TECHNO MOTOR CORPORATION, Kyoto (JP)

( * ) Notice: Subject to any disclaimer, the term of this patent is extended or adjusted under 35 U.S.C. 154(b) by 529 days.

(21) Appl. No.: 14/173,083

(22) Filed: Feb. 5, 2014

(65) Prior Publication Data

US 2014/0232212 A1    Aug. 21, 2014

(30) Foreign Application Priority Data

Feb. 18, 2013 (JP) ................... 2013-028702
Oct. 17, 2013 (JP) ................... 2013-216409

(51) Int. Cl.
*H02K 5/22* (2006.01)
*H02K 3/38* (2006.01)
*H02K 3/50* (2006.01)
*H02K 5/08* (2006.01)

(52) U.S. Cl.
CPC ........ *H02K 3/38* (2013.01); *H02K 3/50* (2013.01); *H02K 5/08* (2013.01); *H02K 5/225* (2013.01)

(58) Field of Classification Search
CPC ............ H02K 1/146; H02K 1/148; H02K 1/187; H02K 1/02; H02K 3/28; H02K 3/38; H02K 3/50; H02K 3/522; H02K 3/528; H02K 5/08; H02K 5/225

USPC .................................. 310/71, 194
See application file for complete search history.

(56) References Cited

U.S. PATENT DOCUMENTS

| 4,287,446 | A  | * | 9/1981  | Lill      | H02K 3/28  |
|           |    |   |         |           | 310/71     |
| 5,672,927 | A  | * | 9/1997  | Viskochil | H02K 1/146 |
|           |    |   |         |           | 310/194    |
| 5,852,335 | A  | * | 12/1998 | Suzuki    | H02K 3/522 |
|           |    |   |         |           | 310/194    |
| 7,923,872 | B2 | * | 4/2011  | Sahara    | H02K 3/522 |
|           |    |   |         |           | 310/194    |
| 7,930,818 | B2 | * | 4/2011  | Hirao     | H02K 3/522 |
|           |    |   |         |           | 29/605     |

(Continued)

FOREIGN PATENT DOCUMENTS

| JP | 2000-014112 A | 1/2000 |
| JP | 2000-078804 A | 3/2000 |

*Primary Examiner* — Tran Nguyen
(74) *Attorney, Agent, or Firm* — Keating & Bennett, LLP

(57) ABSTRACT

A motor includes a casing which is a resin molded article produced by using a core-back, a plurality of teeth, an insulator, a coil, a metal terminal, and a protection member as inserts. The protection member includes a cover section through which the metal terminal penetrates in the axial direction. The protection member or the insulator includes a post section arranged to axially extend in a portion of a surrounding of the metal terminal. A connection space within which a connection point of the metal terminal and the lead wire is disposed is provided between the cover section and the insulator and at the side of the metal terminal from the post section. The lead wire is arranged to reach the connection space through an opening arranged in the post section.

30 Claims, 15 Drawing Sheets

(56) References Cited

U.S. PATENT DOCUMENTS

| | | | |
|---|---|---|---|
| 8,350,436 B2* | 1/2013 | Sakane | H02K 3/522 310/179 |
| 2003/0034708 A1* | 2/2003 | Digby | H02K 3/528 310/194 |
| 2009/0127971 A1* | 5/2009 | Ishizeki | H02K 3/522 310/216.074 |

* cited by examiner

MOTOR

BACKGROUND OF THE INVENTION

1. Field of the Invention

The present invention relates to a motor.

2. Description of the Related Art

In the related art, a motor which includes a resin-molded housing, a stator embedded in the housing, and a rotor arranged inside the housing is known. The motor of this type is superior in the waterproof property of the stator and in the vibration resistance and soundproof property against the vibration of the stator during the operation of the motor.

A motor of the related art is disclosed in, e.g., Japanese Patent Application Publication No. 2000-014112 (JP2000-014112A). In the motor of JP2000-014112A, a stator core, a stator coil, and a terminal pin electrically connected to the terminal of the stator coil are one-piece molded within a resin molding (see claim 1 and paragraph [0025] of JP2000-014112A). An end portion of the terminal pin is exposed from the resin-molded stator. The end portion of the terminal pin is connected to a printed circuit board (see paragraph [0026] and FIG. 2 of JP2000-014112A).

In the motor disclosed in JP2000-014112A, the stator is embedded in a resin and has a one-piece structure. The stator and the circuit board are electrically connected by the terminal pin. In this case, the terminal pin needs to be partially exposed from the resin. At this time, as shown in FIG. 8 of JP2000-078804A, it is conceivable to employ a structure which makes use of a protection member arranged to cover some portions of the terminal pin and the coil terminal and pressed by a resin molding mold. The use of this structure makes it possible to prevent resin leakage during a resin molding process and disconnection of the coil terminal.

In the structure shown in FIG. 8 of JP2000-078804A, however, there is likelihood that a lead wire extending along a lead wire route from the stator coil toward the terminal pin within the protection member will become caught between the protection member and an insulator. If the lead wire is caught between the protection member and the insulator, the protection member may get out of position and, hence, the position of a resin molding mold may be shifted. As a result, there is a possibility that the molding of the stator becomes poor. Moreover, the lead wire may possibly be broken if it is caught between the protection member and the insulator. JP2000-078804A fails to disclose a specific configuration for solving the problems noted above.

SUMMARY OF THE INVENTION

Preferred embodiments of the present invention provide a motor capable of preventing a lead wire from being caught between an insulator and a protection member.

In accordance with a preferred embodiment of the present invention, there is provided a motor, including: a stationary unit; and a rotary unit rotatably supported to rotate about a center axis extending in an axial direction, wherein the stationary unit includes a ring-shaped core-back, a plurality of teeth, a resin insulator, a coil, a metal terminal, a resin protection member, and a casing; the core-back is arranged to surround the center axis, the teeth protrude radially inward or radially outward from the core-back; the insulator includes a first insulating portion, a second insulating portion, a third insulating portion, and a protrusion portion, wherein the first insulating portion is arranged to cover axial opposite end surfaces and circumferential opposite surfaces of the teeth, the second insulating portion is arranged to cover at least a portion of an upper surface of the core-back, the third insulating portion is arranged to cover at least a portion of a lower surface of the core-back, the protrusion portion protrudes upward from the second insulating portion, the coil is defined by a lead wire wound around the teeth through the first insulating portion; the metal terminal is attached to the protrusion portion and provided with an upper end portion positioned axially above the protrusion portion, the metal terminal electrically connected to an end portion of the lead wire; the protection member is arranged to cover a portion of the metal terminal; the casing is a resin molded article produced by using the core-back, the teeth, the insulator, the coil, the metal terminal, and the protection member as insert portions; the protection member includes a cover section through which the metal terminal penetrates in the axial direction; the upper end portion of the metal terminal is positioned axially above an upper surface of the cover section; the protection member or the insulator includes a post section positioned below the cover section and arranged to axially extend in a portion of a surrounding of the metal terminal; a connection space within which a connection point of the metal terminal and the lead wire is disposed is provided between the cover section and the insulator and at the side of the metal terminal from the post section, the post section includes an opening; the lead wire is arranged to reach the connection space through the opening; and the opening is at least larger in size than a cross section of the lead wire.

According to one illustrative preferred embodiment of the present invention, the lead wire is arranged to be inserted into the connection space through the opening. This makes it possible to prevent the lead wire from being caught between the insulator and the protection member. As a result, it is possible to prevent position shift of the protection member and resultant poor molding of the casing. It is also possible to prevent disconnection of the lead wire.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, illustrative preferred embodiments of the present invention will now be described with reference to the drawings which form a portion hereof. In the subject application, the direction parallel or substantially parallel to the center axis of a motor will be referred to as "axial". The direction orthogonal or substantially orthogonal to the center axis of a motor will be referred to as "radial". The direction running along an arc about the center axis of a motor will be referred to as "circumferential". In the subject application, the shape and positional relationship of individual portions will be described under an assumption that the axial direction runs in an up-down direction and the side of a protection member with respect to an insulator is an upper side. However, the definition of the up-down direction is not intended to limit the in-use direction of a motor according to preferred embodiments of the present invention.

In the subject application, the term "parallel" encompasses the terms "parallel" and "substantially parallel". Moreover, the term "orthogonal" encompasses the terms "orthogonal" and "substantially orthogonal".

First Preferred Embodiment

Figure 1:
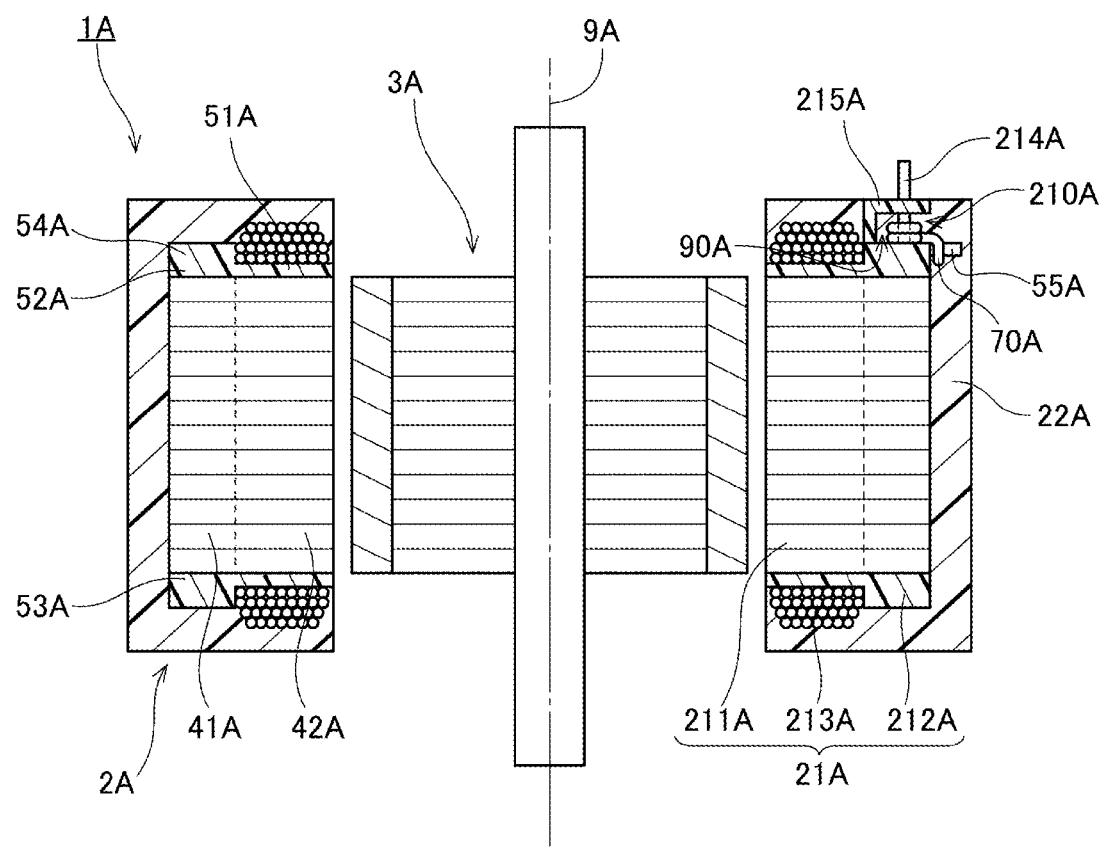
FIG. 1 is a vertical sectional view showing a motor according to a first preferred embodiment of the present invention.
Figure 2:
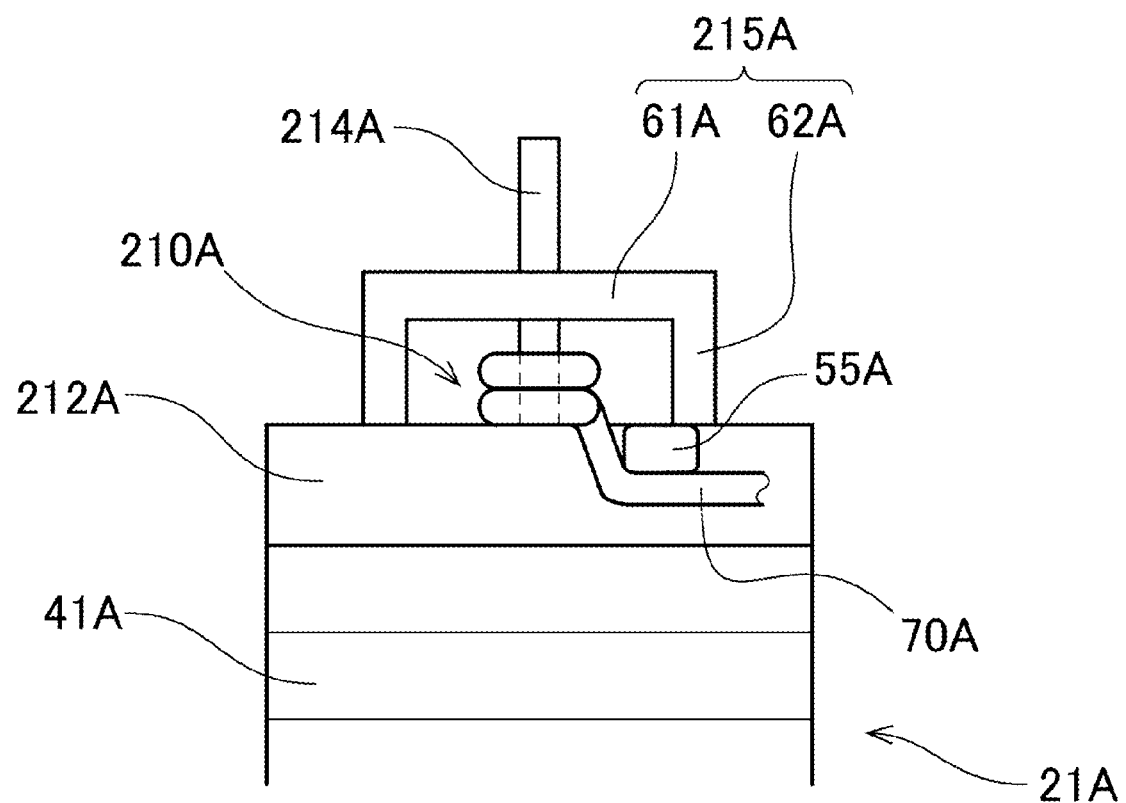
FIG. 2 is a view showing an upper portion of a stator, a metal terminal, and a protection member of the motor according to the first preferred embodiment of the present invention, which are seen from the radial outer side.

FIG. 1 is a vertical sectional view showing a motor 1A according to a first preferred embodiment of the present invention. FIG. 2 is a view showing an upper portion of a stator 21A, a metal terminal 214A, and a protection member 215A (to be described later), which are seen from the radially outer side. As shown in FIG. 1, the motor 1A preferably includes a stationary unit 2A and a rotary unit 3A. The rotary unit 3A is supported to rotate about a center axis 9A.

The stationary unit 2A of the present preferred embodiment preferably includes a stator 21A, a casing 22A, a metal terminal 214A, and a protection member 215A.

The stator 21A preferably includes a stator core 211A, an insulator 212A, and a coil 213A. The stator core 211A preferably includes a ring-shaped core-back 41A and a plurality of teeth 42A. The core-back 41A is arranged to surround the center axis 9A. The teeth 42A protrude radially inward from the core-back 41A. The core-back 41A is preferably arranged in a coaxial or substantially coaxial relationship with the center axis 9A.

The insulator 212A preferably includes a first insulating portion 51A, a second insulating portion 52A, a third insulating portion 53A, a protrusion portion 54A, and a guide projection 55A. The insulator 212A is preferably a resin member. The first insulating portion 51A covers the axial opposite end surfaces and the circumferential opposite surfaces of the teeth 42A. The coil 213A is preferably defined by a lead wire 70A wound around the teeth 42A through the first insulating portion 51A. The second insulating portion 52A covers at least a portion of the upper surface of the core-back 41A. The third insulating portion 53A covers at least a portion of the lower surface of the core-back 41A. The protrusion portion 54A protrudes upward from the second insulating portion 52A. The guide projection 55A protrudes from the side surface of the protrusion portion 54A.

The metal terminal 214A is a columnar conductor extending in the up-down direction. The lower end of the metal terminal 214A is attached to the protrusion portion 54A. The upper end of the metal terminal 214A is positioned higher than the protrusion portion 54A. The metal terminal 214A is electrically connected to the end portion of the lead wire 70A.

The protection member 215A is preferably a resin member which covers a portion of the metal terminal 214A. The protection member 215A preferably includes a cover section 61A and a post section 62A extending downward from the cover section 61A. As shown in FIG. 2, the cover section 61A is preferably fitted to the metal terminal 214A which axially penetrates the cover section 61A. Thus, the upper end of the metal terminal 214A is positioned higher than the upper surface of the cover section 61A. The post section 62A is positioned below the cover section 61A to axially extend in a portion of the surrounding of the metal terminal 214A. The "post section" recited in the subject application is referred to as a "wall portion" in Japanese Patent Application No. 2013-028702, priority to which is claimed in the subject application.

The casing 22A is preferably a resin-molded article in which the stator 21A, the metal terminal 214A, and the protection member 215A are used as inserts. Thus, the core-back 41A and the teeth 42A of the stator core 211A, the insulator 212A, the coil 213A, the metal terminal 214A, and the protection member 215A are at least partially covered by a resin material which defines the casing 22A.

As shown in FIGS. 1 and 2, a connection space 90A is preferably provided between the cover section 61A and the insulator 212A and at the side of the metal terminal 214A from the post section 62A. A connection point of the metal terminal 214A and the lead wire 70A is arranged in the connection space 90A. The post section 62A has an opening 210A larger than the cross section of the lead wire 70A. The opening 210A is arranged between the protection member 215A and the insulator 212A. The lead wire 70A extending from the coil 213A runs upward along the guide projection 55A from below the guide projection 55A and reaches the connection space 90A existing inside the post section 62A through the opening 210A. In the connection space 90A, the lead wire 70A and the metal terminal 214A are electrically connected to each other.

As described above, in the motor 1A, the lead wire 70A is arranged to be inserted into the connection space 90A through the opening 210A. This makes it possible to prevent the lead wire 70A from being caught between the insulator 212A and the protection member 215A. As a result, it is possible to prevent position shift of the protection member 215A and resultant poor molding of the casing 22A. It is also possible to prevent disconnection of the lead wire 70A.

In the motor 1A, the lead wire 70A is arranged along the guide projection 55A of the insulator 212A. Thus, the route of the lead wire 70A extending into the protection member 215A is decided. This makes it possible to more reliably prevent the lead wire 70A from being caught between the insulator 212A and the post section 62A of the protection member 215A. As a result, it is possible to more reliably prevent position shift of the protection member 215A and resultant poor molding of the casing 22A. It is also possible to more reliably prevent disconnection of the lead wire 70A.

Second Preferred Embodiment

Figure 3:
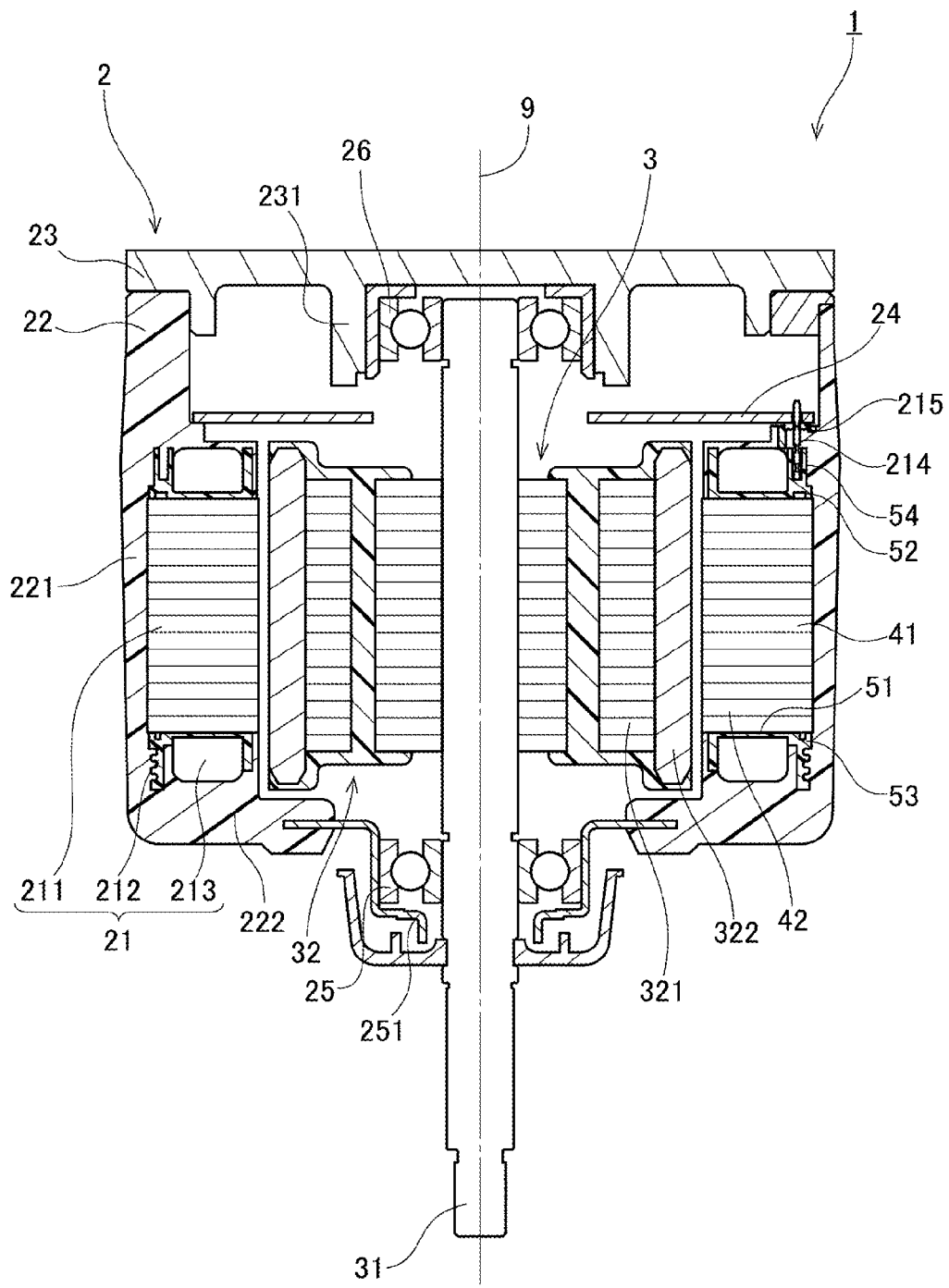
FIG. 3 is a vertical sectional view showing a motor according to a second preferred embodiment of the present invention.

Next, description will be made of a second preferred embodiment of the present invention. FIG. 3 is a vertical sectional view showing a motor 1 according to a second preferred embodiment. The motor 1 is preferably used in, e.g., home appliances such as, for example, an air conditioner and the like. However, the motor of various preferred embodiments of the present invention may be used in applications other than home appliances. For example, the motor of various preferred embodiments of the present invention may be mounted to transportation devices such as, for example, a motor vehicle and a railroad vehicle, office automation devices, medical instruments, tools, or large-scale industrial equipment, and may be used to generate different kinds of driving power.

As shown in FIG. 3, the motor 1 preferably includes a stationary unit 2 and a rotary unit 3. The stationary unit 2 is preferably fixed to a frame of a home appliance. The rotary unit 3 is supported to rotate about a center axis 9.

The stationary unit 2 of the present preferred embodiment preferably includes a stator 21, a casing 22, a cover 23, a circuit board 24, a lower bearing unit 25, and an upper bearing unit 26. The rotary unit 3 preferably includes a shaft 31 and a rotor 32.

The stator 21 is preferably an armature arranged radially outward of the rotor 32. The stator 21 preferably includes a stator core 211, an insulator 212, and a plurality of coils 213.

The stator core 211 is preferably made from a laminated steel plate produced by, for example, axially laminating electromagnetic steel sheets. The stator core 211 preferably includes a ring-shaped core-back 41 and a plurality of teeth 42. The stator core 211 is arranged in a coaxial or substantially coaxial relationship with the center axis 9 to surround the center axis 9. The stator core 211 is fixed to the casing 22.

The stator core 211 of the present preferred embodiment is preferably defined by so-called split cores. In other words, the core-back 41 of the stator core 211 is preferably provided by a plurality of circumferentially-arranged core pieces 411. The teeth 42 extend radially inward from the respective core pieces 411. The teeth 42 are arranged at a regular or substantially regular interval along the circumferential direction. Alternatively, a single ring-shaped stator core may be used in place of the split cores.

The insulator 212 is preferably made from an electrically insulating resin material. The insulator 212 preferably includes a first insulating portion 51 which covers the axial opposite end surfaces and the circumferential opposite end surfaces of each of the teeth 42. The lead wire defining the coils 213 is wound around the teeth 42 through the first insulating portion 51. The specific shape of the insulator 212 will be described later.

The casing 22 is preferably a resin member arranged to hold the stator 21. The casing 22 is preferably obtained by allowing a resin to flow into a mold in which the stator 21, the below-mentioned metal terminals 214, and protection member 215 are arranged. That is to say, the casing 22 is a resin-molded article in which the stator 21, the metal terminals 214, and the protection member 215 are used as inserts. Thus, the stator 21, the metal terminals 214, and the protection member 215 are at least partially covered with the casing 22.

The casing 22 of the present preferred embodiment preferably includes a cylinder portion 221 and a bottom portion 222. The cylinder portion 221 preferably extends cylindrically or substantially cylindrically in the axial direction. The stator 21 and the rotor 32 are accommodated at the radial inner side of the cylinder portion 221. The outer circumferential surface of the core-back 41 is covered with the cylinder portion 221. The bottom portion 222 is arranged below the stator 21 to extend radially inward from the cylinder portion 221. A lower bearing retainer unit 251 arranged to retain the lower bearing unit 25 is fixed to the central section of the bottom portion 222.

The cover 23 is arranged above the casing 22 to cover an upper opening of the casing 22. An upper bearing retainer unit 231 arranged to retain the upper bearing unit 26 is provided in the central section of the cover 23.

The circuit board 24 is preferably horizontally or substantially horizontally arranged above the stator 21 and the rotor 32 and radially inward of the cylinder portion 221 of the casing 22. An electronic circuit arranged to supply a drive current to the coils 213 is mounted to the surface of the circuit board 24. The end portion of the lead wire defining the coils 213 is electrically connected to the electronic circuit on the circuit board 24 via the below-mentioned metal terminals 214. An electric current supplied from an external power supply is fed to the coils 213 via the circuit board 24 and the metal terminals 214.

The lower bearing unit 25 is a mechanism arranged below the rotor 32 to rotatably support the shaft 31. The lower bearing unit 25 is fixed to the bottom portion 222 of the casing 22 through the lower bearing retainer unit 251. The upper bearing unit 26 is a mechanism arranged above the rotor 32 to rotatably support the shaft 31. The upper bearing unit 26 is fixed to the upper bearing retainer unit 231 of the cover 23. Ball bearings, in which an outer race and an inner race are caused to make relative rotation through balls, are preferably used as the lower bearing unit 25 and the upper bearing unit 26 of the present preferred embodiment. Alternatively, other kinds of bearings such as, for example, plain bearings and fluid bearings may be used in place of the ball bearings.

The shaft 31 is a columnar member extending in the axial direction. The shaft 31 is supported by the lower bearing unit 25 and the upper bearing unit 26 to rotate about the center axis 9. The lower end of the shaft 31 protrudes further downward than the lower surface of the casing 22. For example, a fan of an air conditioner may be attached to the lower end of the shaft 31. Alternatively, the lower end of the shaft 31 may be connected to a driving unit other than the fan via a power transmission mechanism such as, for example, a gear or the like.

While the shaft 31 of the present preferred embodiment protrudes more downward than the casing 22, the present invention is not limited thereto. The shaft 31 may protrude more upward than the casing 22 and the cover 23 so that the upper end portion of the shaft 31 can be connected to a driving unit. Moreover, the shaft 31 may protrude downward beyond the casing 22 and upward beyond the cover 23 so that the lower end and the upper end portion of the shaft 31 can be connected to different driving units.

The rotor 32 is arranged radially inward of the stator 21 and around the shaft 31 to rotate together with the shaft 31. The rotor 32 preferably includes a rotor core 321 and a plurality of magnets 322. The rotor core 321 is preferably made from a laminated steel plate produced by, for example, axially laminating electromagnetic steel sheets. The magnets 322 are arranged around the rotor core 321. The radial outer surfaces of the respective magnets 322 are magnetic pole surfaces facing the radial inner surfaces of the teeth 42. The magnets 322 are arranged at a regular interval along the circumferential direction such that magnetic pole surfaces of N-pole and magnetic pole surfaces of S-pole are alternately disposed side by side.

A single ring-shaped magnet may be used instead of the magnets 322. In case of using the ring-shaped magnet, it is preferred that N-poles and S-poles are alternately arranged along the circumferential direction on the outer circumferential surface of the ring-shaped magnet. The magnet and the rotor core may be one-piece molded by a resin with which a magnetic powder is mixed. In addition, the magnet may be arranged within the rotor core.

When driving the motor 1, a drive current is supplied to the coils 213. By doing so, magnetic flux is generated in the teeth 42 of the stator core 211. Then, a circumferential torque is generated by the action of the magnetic flux between the teeth 42 and the magnets 322. As a result, the rotary unit 3 is rotated about the center axis 9 with respect to the stationary unit 2.

In addition to the aforementioned components, the stationary unit 2 of the motor 1 of the present preferred embodiment preferably includes three metal terminals 214 and a protection member 215. The specific shape of the insulator 212, the three metal terminals 214 and the protection member 215 will now be described in detail.

Figure 4:
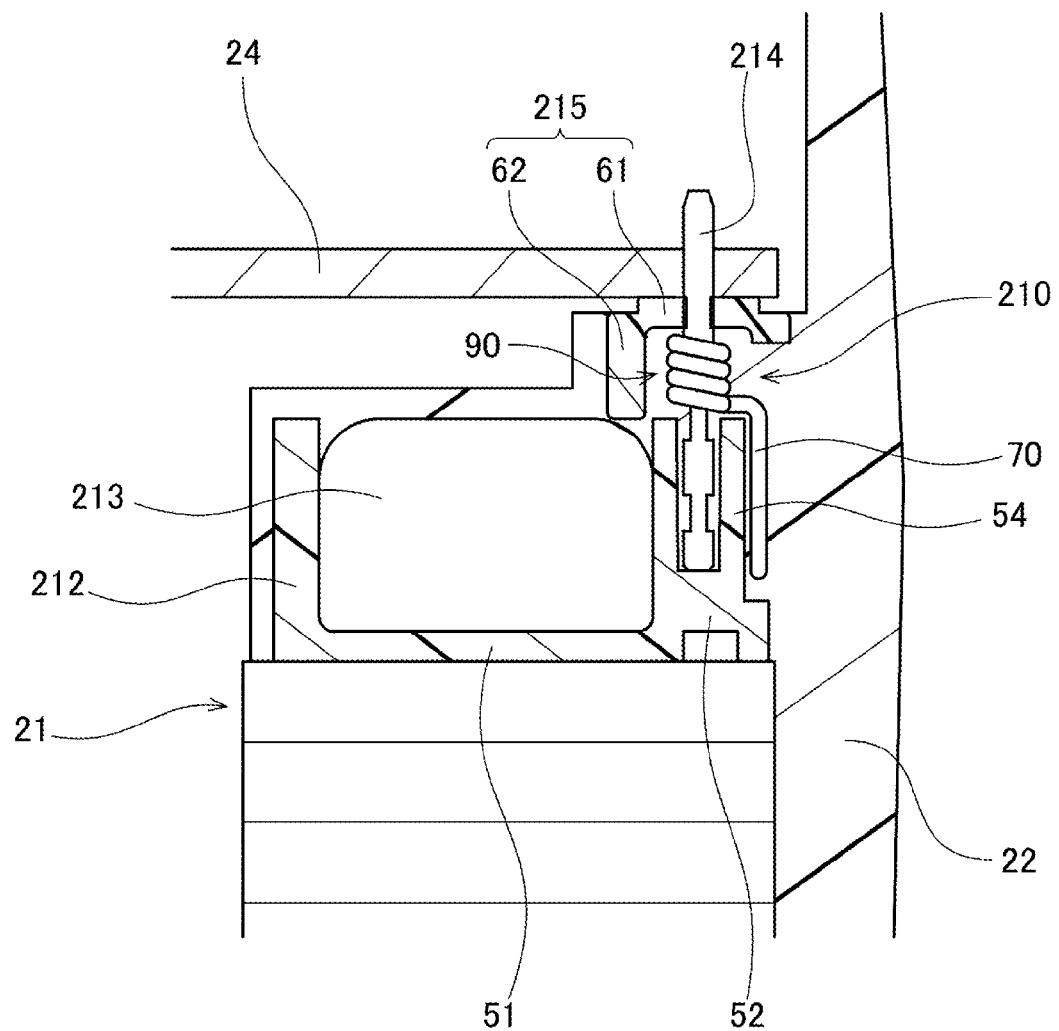
FIG. 4 is a partial sectional view of the motor according to the second preferred embodiment of the present invention.
Figure 5:
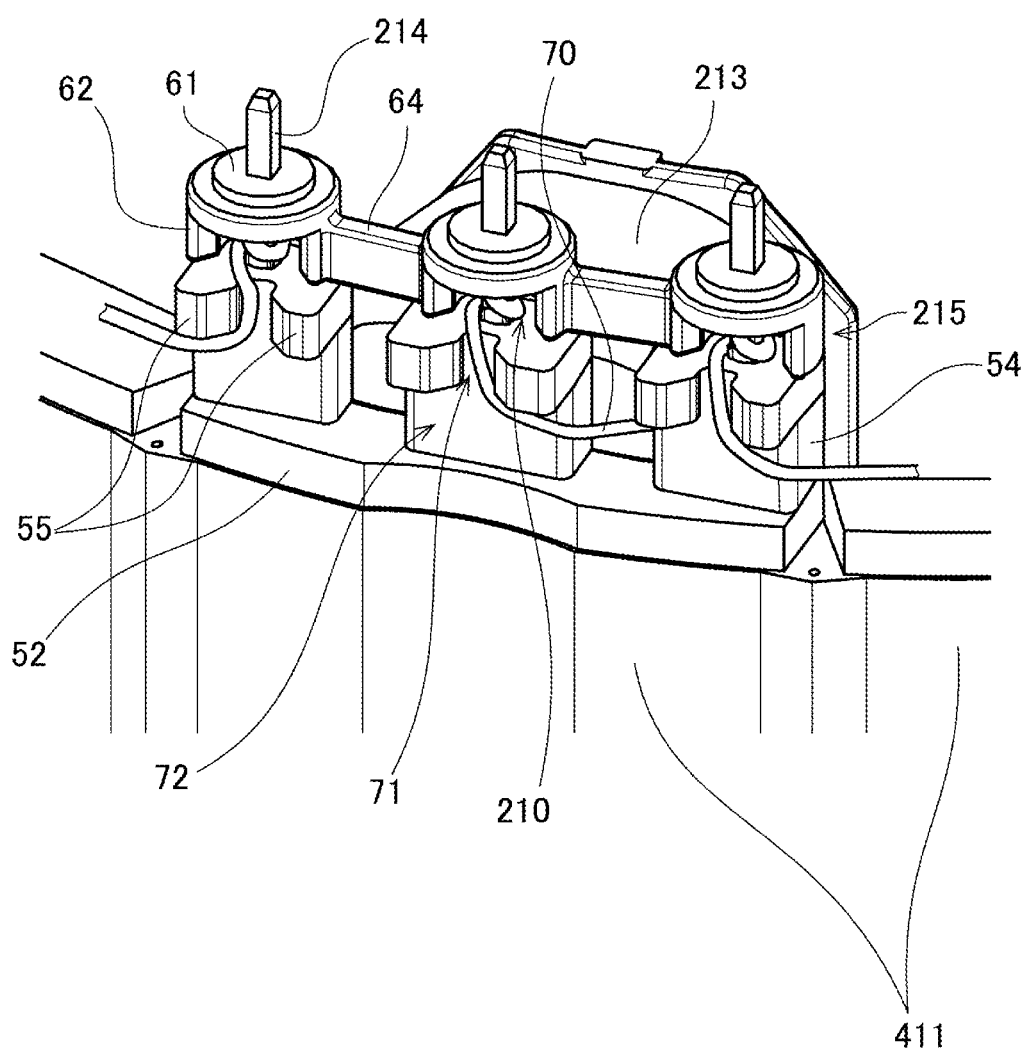
FIG. 5 is a partial perspective view showing a stator, metal terminals, and a protection member included in the motor according to the second preferred embodiment of the present invention.
Figure 6:
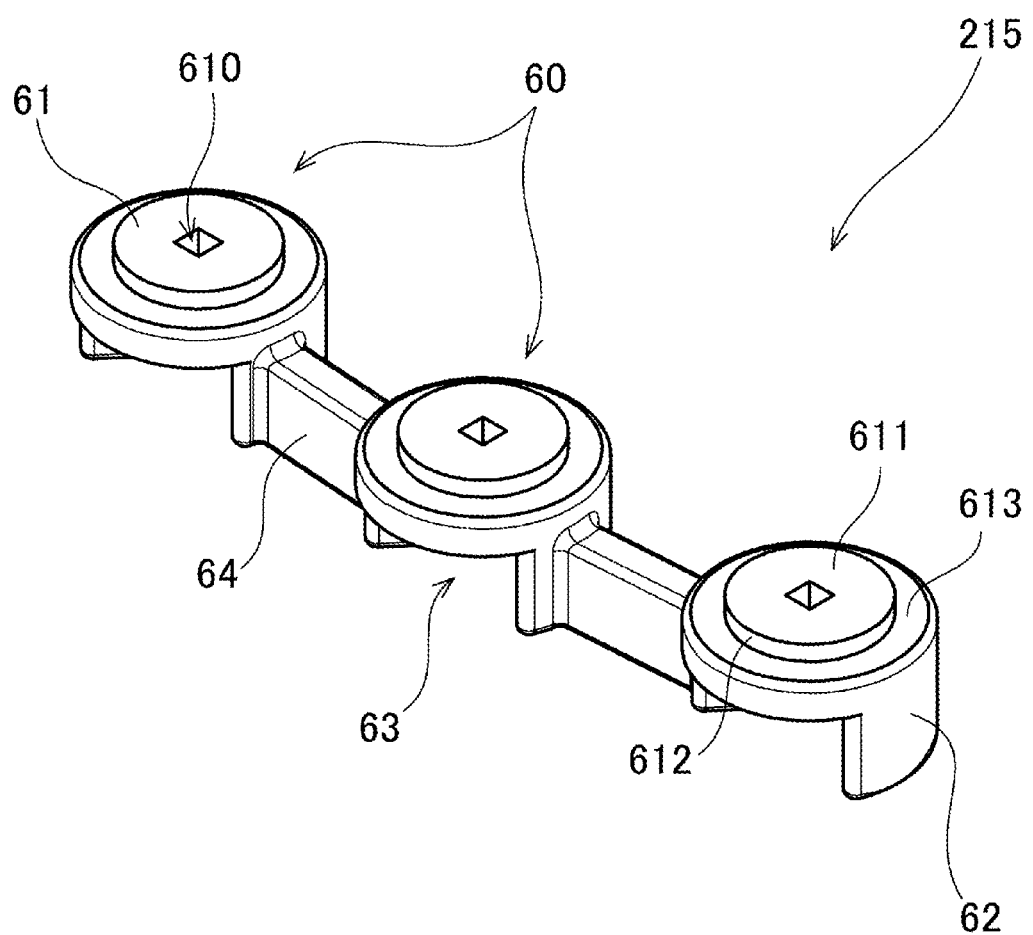
FIG. 6 is a partial perspective view of the protection member included in the motor according to the second preferred embodiment of the present invention.
Figure 7:
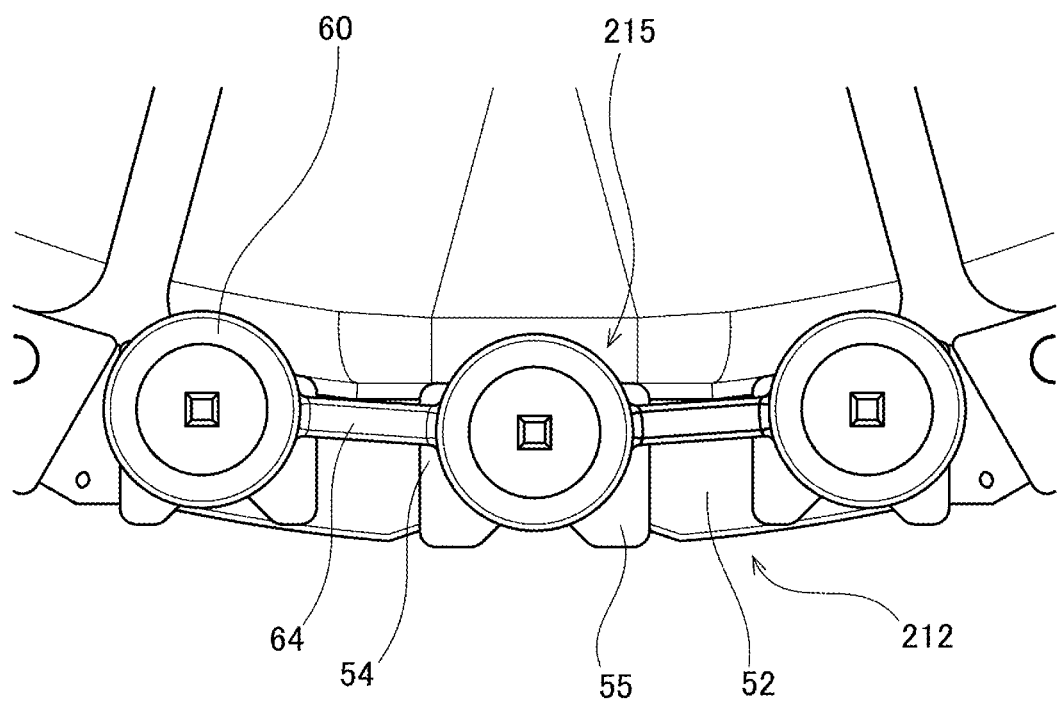
FIG. 7 is a partial plan view of the stator, the metal terminals, and the protection member included in the motor according to the second preferred embodiment of the present invention.
Figure 8:
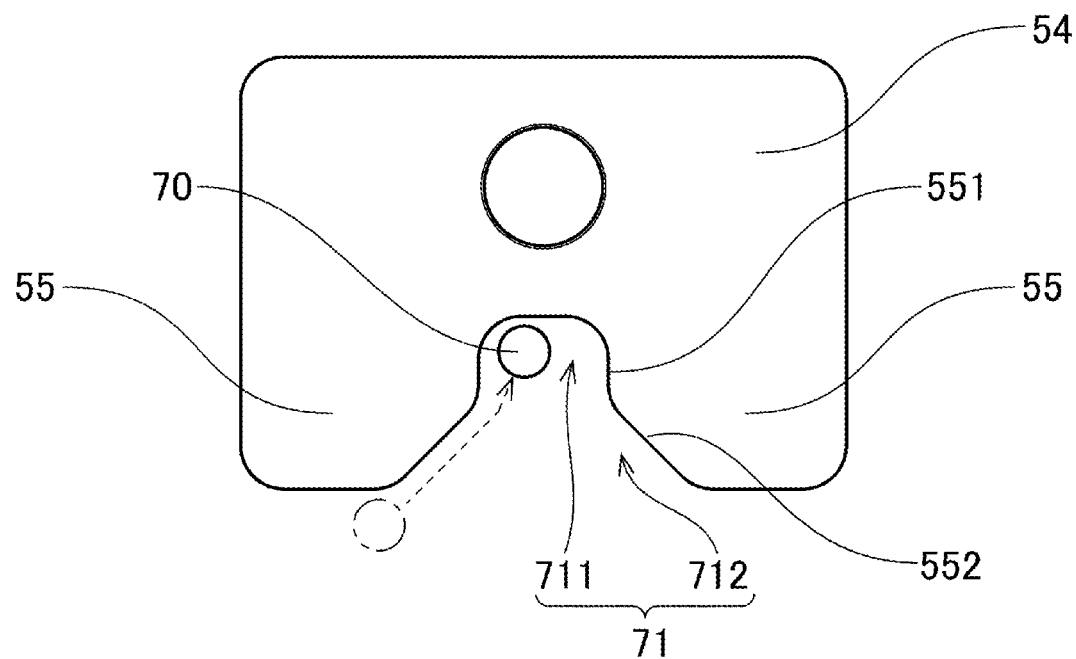
FIG. 8 is a partial plan view showing an insulator included in the motor according to the second preferred embodiment of the present invention.

FIG. 4 is a partial sectional view of the motor 1. FIG. 5 is a partial perspective view showing the stator 21, the metal terminals 214 and the protection member 215. FIG. 6 is a perspective view of the protection member 215. FIG. 7 is a partial plan view of the stator 21, the metal terminals 214, and the protection member 215. FIG. 8 is a partial plan view of the insulator 212.

As shown in FIGS. 3 to 5, the insulator 212 preferably includes a first insulating portion 51, a second insulating portion 52, a third insulating portion 53, a protrusion portion 54, and a guide projection 55. The insulator 212 may be a single member or may be defined by a plurality of members. For example, one or more of the first insulating portion 51, the second insulating portion 52, the third insulating portion 53, the protrusion portion 54, and the guide projection 55 may be provided independently of the remaining members.

As mentioned earlier, the first insulating portion 51 preferably covers the axial opposite end surfaces and the circumferential opposite surfaces of each of the teeth 42. The second insulating portion 52 covers at least a portion of the upper surface of the core-back 41. The third insulating portion 53 covers at least a portion of the lower surface of the core-back 41. The first insulating portion 51, the second insulating portion 52 and the third insulating portion 53 are radially connected to one another.

The protrusion portion 54 protrudes upward from the second insulating portion 52. In the present preferred embodiment, as shown in FIG. 5, three protrusion portions 54 are preferably arranged above one of the core pieces 411. The lower end portions of the metal terminals 214 are fixed to the three protrusion portions 54, respectively. The three protrusion portions 54 are arranged in a circumferential spaced-apart relationship with one other. A lead wire 70 extending from the coils 213 positioned radially inward of the protrusion portions 54 is led toward the below-mentioned guide projection 55 through between the adjoining protrusion portions 54.

The guide projection 55 protrudes radially outward from a radial outer surface of each of the protrusion portions 54. In the present preferred embodiment, two guide projections 55 are provided with respect to each of the protrusion portions 54. However, the number of the guide projections 55 may be one or three or more. The specific shape of the guide projections 55 will be described later.

The three metal terminals 214 are columnar conductors extending in the up-down direction. Each of the metal terminals 214 is preferably made of an electrically conductive material such as, for example, iron or copper. The lower end portion of each of the metal terminals 214 is attached to each of the protrusion portions 54. As a method of fixing the protrusion portions 54 and the metal terminals 214 to each other, it may be possible to use, e.g., press-fitting or bonding. The protrusion portions 54 and the metal terminals 214 may be fixed to each other by molding the protrusion portions 54 using the metal terminals 214 as inserts. The upper ends of the respective metal terminals 214 are positioned higher than the upper surfaces of the protrusion portions 54.

In the present preferred embodiment, one metal terminal 214 is preferably fixed to one protrusion portion 54. Alternatively, two or more metal terminals 214 may be fixed to one protrusion portion 54. In the present preferred embodiment, three metal terminals 214 are arranged above one core piece 411. Alternatively, the three metal terminals 214 may be dispersedly arranged above a plurality of core pieces 411.

The protection member 215 is preferably a resin member which covers portions of the metal terminals 214. As shown in FIG. 6, the protection member 215 of the present preferred embodiment preferably includes three cap portions 60 and two connecting portions 64.

The three cap portions 60 are arranged in the circumferential direction. Each of the cap portions 60 preferably includes a cover section 61, a post section 62, and a cutout section 63. The cover section 61 is arranged above each of the protrusion portions 54 to extend in the direction orthogonal in a disc shape or substantially in a disc shape to the center axis 9. A through-hole 610 extending through the cover section 61 in the up-down direction is preferably arranged at or substantially at the center of the cover section 61. Each of the metal terminals 214 is preferably inserted into the through-hole 610. That is to say, the cover section 61 is fitted to each of the metal terminals 214. Each of the metal terminals 214 axially penetrates the cover section 61. Accordingly, the upper end of each of the metal terminals 214 is positioned higher than the upper surface of the cover section 61.

Instead of the through-hole 610, a cutout may be defined in the cover section 61 and each of the metal terminals 214 may be inserted into the cutout. If the through-hole 610 is included, the surface of the cover section 61 defining the through-hole 610 surrounds the side surface of each of the metal terminals 214 over the entire circumference thereof. For that reason, as compared with a case where the cutout is included, it is possible to simplify the shape of a mold which makes contact with the protection member 215 during an insert molding process to be described later. In the present preferred embodiment, each of the metal terminals 214 is preferably press-fitted into the through-hole 610. This helps reduce a clearance which may exist between the cover section 61 and each of the metal terminals 214. Thus, a resin is not leaked or only barely leaked from the lower side of the cover section 61 to the upper side thereof in the insert molding process to be described later.

The through-hole 610 of the cover section 61 may be larger in size than each of the metal terminals 214 when seen in a plan view. If the through-hole 610 is made larger in size, each of the metal terminals 214 can be easily inserted into the through-hole 610 even though each of the metal terminals 214 is deformed before its assembly. In this case, the clearance around each of the metal terminals 214 inserted into the through-hole 610 is set into such a size that a molten resin cannot pass through the clearance during an insert molding process. This helps prevent a resin from being leaked from the lower side of the cover section 61 to the upper side thereof.

The cross-sectional shape of each of the metal terminals 214 may be rectangular or circular, for example. Moreover, the plan-view shape of the through-hole 610 defined in the cover section 61 may be either rectangular or circular, for example.

In the present preferred embodiment, at least a portion of the upper surface of the cover section 61 is exposed from the surface of the casing 22. This makes it possible to prevent a resin from making contact with each of the metal terminals 214 at the upper side of the cover section 61 during an insert molding process to be described later. The specific shape of the upper surface of the cover section 61 will be set forth later.

The post section 62 extends downward from the outer edge portion of the lower surface of the cover section 61. A portion of each of the metal terminals 214 is covered by the upper surface of each of the protrusion portions 54, the lower surface of the cover section 61 and the inner circumferential surface of the post section 62. The post section 62 is positioned around each of the metal terminals 214. When seen in a plan view, the post section 62 extends in arc-shaped or substantially arc-shaped. That is to say, the post section 62 is positioned below the cover section 61. The post section 62 axially extends in a portion of the surrounding of each of the metal terminals 214.

A connection space 90, within which a connection point of each of the metal terminals 214 and the lead wire 70 is disposed, exists between the cover section 61 and the insulator 212 and at the side of each of the metal terminals 214 from the post section 62. A cutout section 63 is preferably defined in a portion of the post section 62. The cutout section 63 enables the connection space 90 arranged inside the post section 62 to radially communicate with the space existing outside the post section 62. The cutout section 63 of the present preferred embodiment is opened toward the lower end portion of the post section 62.

It is preferred that at least a portion of the post section 62 is positioned radially inward of each of the metal terminals 214. In the present preferred embodiment, the post section 62 preferably extends over a range spanning from the radial inner side of each of the metal terminals 214 to the circumferential opposite sides thereof. Therefore, as a compared with a case where the post section 62 exists only at the radial inner side of each of the metal terminals 214, the contact area over which the post section 62 makes contact with the upper surface of each of the protrusion portions 54 becomes larger. This makes it possible to stably arrange the protection member 215 with respect to each of the protrusion portions 54.

Each of the two connecting portions 64 interconnects the cap portions 60 adjoining in the circumferential direction. The connecting portions 64 preferably extend in a flat or substantially flat shape along the circumferential direction. The circumferential opposite ends of each of the connecting portions 64 are connected to the circumferential side surfaces of the cap portions 60. This makes it possible to simultaneously attach the three cap portions 60 to the three metal terminals 214. Therefore, as compared with a case where individual cap portions 60 are independently attached to the metal terminals 214, it is possible to reduce the number of steps in a manufacturing process.

As shown in FIG. 5, the lower end portion of the post section 62 except the cutout section 63 preferably contacts the upper surface of each of the protrusion portions 54. Thus, an opening 210 defined by the cutout section 63 is provided between each of the protrusion portions 54 and each of the cap portions 60. In other words, the opening 210 of the present preferred embodiment is a space surrounded by each of the protrusion portions 54, the cover section 61, and the post section 62. The opening 210 is at least larger in size than the cross section of the lead wire 70. The lead wire 70 extending from the coils 213 is inserted into the connection space 90 through the opening 210. This makes it possible to prevent the lead wire 70 from being caught between the post section 62 and each of the protrusion portions 54. As a result, it is possible to prevent position shift of the protection member 215 and resultant poor molding of the casing 22. It is also possible to prevent disconnection of the lead wire 70 which may otherwise be caused by the lead wire 70 being caught between the post section 62 and each of the protrusion portions 54.

In the present preferred embodiment, the opening 210 is provided radially outward of each of the metal terminals 214. That is to say, the opening 210 is positioned at the opposite side from each of the coils 213 with respect to a cylindrical plane whose radius is equal to the distance from the center axis 9 to each of the metal terminals 214. Thus, the end portion of the lead wire 70 can be led out from each of the coils 213 to the radial outer side of each of the protrusion portions 54 and, then, can be introduced into the connection space 90 through the opening 210. This makes it possible to prevent or significantly reduce bending of the lead wire 70.

Next, description will be made of the specific preferred shape of the guide projections 55 and the route of the lead wire 70.

As shown in FIGS. 5 and 8, the guide projections 55 of the present preferred embodiment are positioned axially downward of the opening 210. The guide projections 55 protrude radially outward from the upper portion of the radial outer surface of each of the protrusion portions 54. That is to say, in the present preferred embodiment, the guide projections 55 protrude from the surface of each of the protrusion portions 54 positioned at the opposite side from the coils 213, namely the radial outer surface of each of the protrusion portions 54. This makes it easy to prevent or significantly reduce bending of the lead wire 70 led out from the coils 213.

In the present preferred embodiment, a pair of guide projections 55 are arranged to protrude from one protrusion portion 54. A first guide groove 71 is provided between the guide projections 55. As shown in FIG. 8, the first guide groove 71 is defined by the mutually-facing surfaces of the guide projections 55 and the radial outer surface of each of the protrusion portions 54.

In the present preferred embodiment, the mutually-opposing surfaces of the guide projections 55 preferably include a pair of inner opposing surfaces 551 and a pair of outer opposing surfaces 552 positioned radially outward of the inner facing surfaces 551. The inner opposing surfaces 551 extend in a parallel or substantially parallel relationship with each other. The outer opposing surfaces 552 extend radially outward so as to divert away from each other. The radial inner ends of the inner opposing surfaces 551 are joined to the radial outer surface of each of the protrusion portions 54. The radial outer ends of the inner opposing surfaces 551 are joined to the radial inner ends of the outer opposing surfaces 552. The radial outer ends of the outer opposing surfaces 552 are joined to the radial outer surfaces of the guide projections 55.

In other words, the first guide groove 71 preferably includes an inner groove 711 and an outer groove 712. The outer groove 712 is defined by the outer opposing surfaces 552. The width of the outer groove 712 becomes narrower toward each of the metal terminals 214. The inner groove 711 is further depressed from the end of the outer groove 712 existing at the side of each of the metal terminals 214 toward each of the metal terminals 214. The inner groove 711 is defined by the inner opposing surfaces 551 and the radial outer surface of each of the protrusion portions 54.

As shown in FIGS. 5 and 8, a portion of the lead wire 70 is arranged within the inner groove 711. In FIG. 8, the position of the lead wire 70 assumed just prior to the lead wire 70 being disposed in the inner groove 711 in a manufacturing process of the motor 1 is indicated by a circular chain line, and the moving route of the lead wire 70 moving toward the inner groove 711 is indicated by a broken line. As set forth above, the circumferential width of the outer groove 712 is decreased radially inward. This makes it possible to easily guide the lead wire 70 into the inner groove 711 along the outer opposing surfaces 552. The circumferential width of the inner groove 711 is constant or substantially constant regardless of the radial positions. This prevents the radial outward movement of the lead wire 70 disposed within the inner groove 711, thus making the position of the lead wire 70 stable.

As shown in FIG. 5, the insulator 212 of the present preferred embodiment preferably includes a second guide groove 72 positioned between the second insulating portion 52 and the guide projections 55. The second guide groove 72 is defined by the upper surface of the second insulating portion 52, the radial outer surface of each of the protrusion portions 54 and the lower surfaces of the guide projections 55. A portion of the lead wire 70 is preferably disposed within the second guide groove 72. Thus, the relevant portion of the lead wire 70 is located between the second insulating portion 52 and the guide projections 55. This enables the lead wire 70 to run along the guide projections 55 from below the guide projections 55 and to extend into the first guide groove 71. The second insulating portion 52 is interposed between the relevant portion of the lead wire 70 and the stator core 211. Thus, the lead wire 70 and the stator core 211 are electrically insulated from each other.

In order to enable the lead wire 70 to naturally face the opening 210 under the guidance of the guide projections 55, it is preferred that the positional relationship of the guide projections 55 and the opening 210 is appropriately set. More specifically, it is preferred that the circumferential position of the radial outer surface of each of the guide projections 55 existing at the side of lead wire 70 or the circumferential position of the portion of the surface of each of the guide projections 55 making contact with the lead wire 70 at least partially overlaps with the circumferential position of the opening 210.

Now, the arrangement route of the lead wire 70 will be described again with reference to FIG. 5. In the present preferred embodiment, as described above, three protrusion portions 54 are preferably arranged above one core piece 411. The metal terminals 214 are fixed to the respective protrusion portions 54. For the sake of convenience, description will now be made using the left-right direction in FIG. 5. For example, the three protrusion portions 54 will be referred to as a "left protrusion portion 54", a "central protrusion portion 54" and a "right protrusion portion 54" in the arrangement order from the left side to the right side in FIG. 5. This holds true with respect to the three metal terminals 214 and the three cap portions 60. Likewise, the core piece 411 provided below the three protrusion portions 54 and the three metal terminals 214 will be referred to as a "central core piece 411". The core pieces 411 adjoining the central core piece 411 at the right and left sides thereof will be referred to as a "right core piece 411" and a "left core piece 411", respectively.

The motor 1 of the present preferred embodiment is preferably a three-phase synchronous motor. Thus, three lead wires 70 corresponding to a U-phase, a V-phase and a W-phase are electrically connected to the three metal terminals 214, respectively. The three metal terminals 214 are electrically connected to the circuit board 24 arranged outside the casing 22.

In the present preferred embodiment, the lead wire 70 extends from the coil 213 wound around the tooth 42 of the central core piece 411 (hereinafter referred to as a "central coil 213"). The lead wire 70 is led into the second guide groove 72 from between the central protrusion portion 54 and the right protrusion portion 54. Then, the lead wire 70 changes its direction to extend upward along the right guide projection 55 from below the right guide projection 55. Thereafter, the lead wire 70 extends from the first guide groove 71 through the opening 210 and reaches the inside of the central cap portion 60. The end portion of the lead wire 70 is tied around the metal terminal 214 in the connection space 90 existing inside the post section 62 of the cap portion 60. The lead wire 70 extending from the central coil 213 may be led from between the central protrusion portion 54 and the left protrusion portion 54.

In addition, the lead wire 70 extends from the coil 213 positioned at the right side of the central coil 213. The lead wire 70 is led into the second guide groove 72 from the right side of the right protrusion portion 54. Then, the lead wire 70 changes its direction to extend upward along the right guide projection 55 from below the right guide projection 55. Thereafter, the lead wire 70 extends from the first guide groove 71 through the opening 210 and reaches the inside of the right cap portion 60. Similarly, the lead wire 70 extends from the coil 213 positioned at the left side of the central coil 213. The lead wire 70 is led into the second guide groove 72 from the left side of the left protrusion portion 54. Then, the lead wire 70 changes its direction to extend upward along the left guide projection 55 from below the left guide projection 55. Thereafter, the lead wire 70 extends from the first guide groove 71 through the opening 210 and reaches the inside of the left cap portion 60.

In the present preferred embodiment, the post section 62 is preferably not provided in the insulator 212 but is provided in the protection member 215. Thus, when connecting the lead wire 70 to the metal terminal 214, it is possible to tie the lead wire 70 around the metal terminal 214 with the protection member 215 including the post section 62 removed. Accordingly, the task of connecting the lead wire 70 to the metal terminal 214 is easy to perform.

In the present preferred embodiment, the first guide groove 71 extends in the axial direction. The cutout section 63 of each of the three cap portions 60 is arranged so as to circumferentially overlap with the first guide groove 71. That is to say, three openings 210 and three first guide grooves 71 are arranged in the same circumferential position. This makes it easy to guide the lead wire 70 from the first guide groove 71 to the opening 210. In the present preferred embodiment, each of the metal terminals 214 and each of the first guide grooves 71 are arranged in the same circumferential position. Thus, regardless of whether the lead wire 70 extends from the left side of the first guide groove 71 or the right side thereof, it is easy to guide the lead wire 70 into the opening 210.

In order to make the lead wire 70 easily guidable to the opening 210 regardless of the direction in which the lead wire 70 is led out, it is preferred that one or both of the opening 210 and the metal terminal 214 and the first guide groove 71 are at least partially arranged in the same circumferential position.

In the motor 1 of the present preferred embodiment, the lead wire 70 is preferably arranged along the guide projections 55 of the insulator 212. That is to say, a portion of the route of the lead wire 70 extending from the coil 213 into the cap portion 60 of the protection member 215 is located in position by the guide projections 55. This makes it possible to prevent the lead wire 70 from being caught between the insulator 212 and the protection member 215. As a result, it is possible to more reliably prevent position shift of the protection member 215 and resultant poor molding of the casing 22. It is also possible to more reliably prevent disconnection of the lead wire 70.

Figure 9:
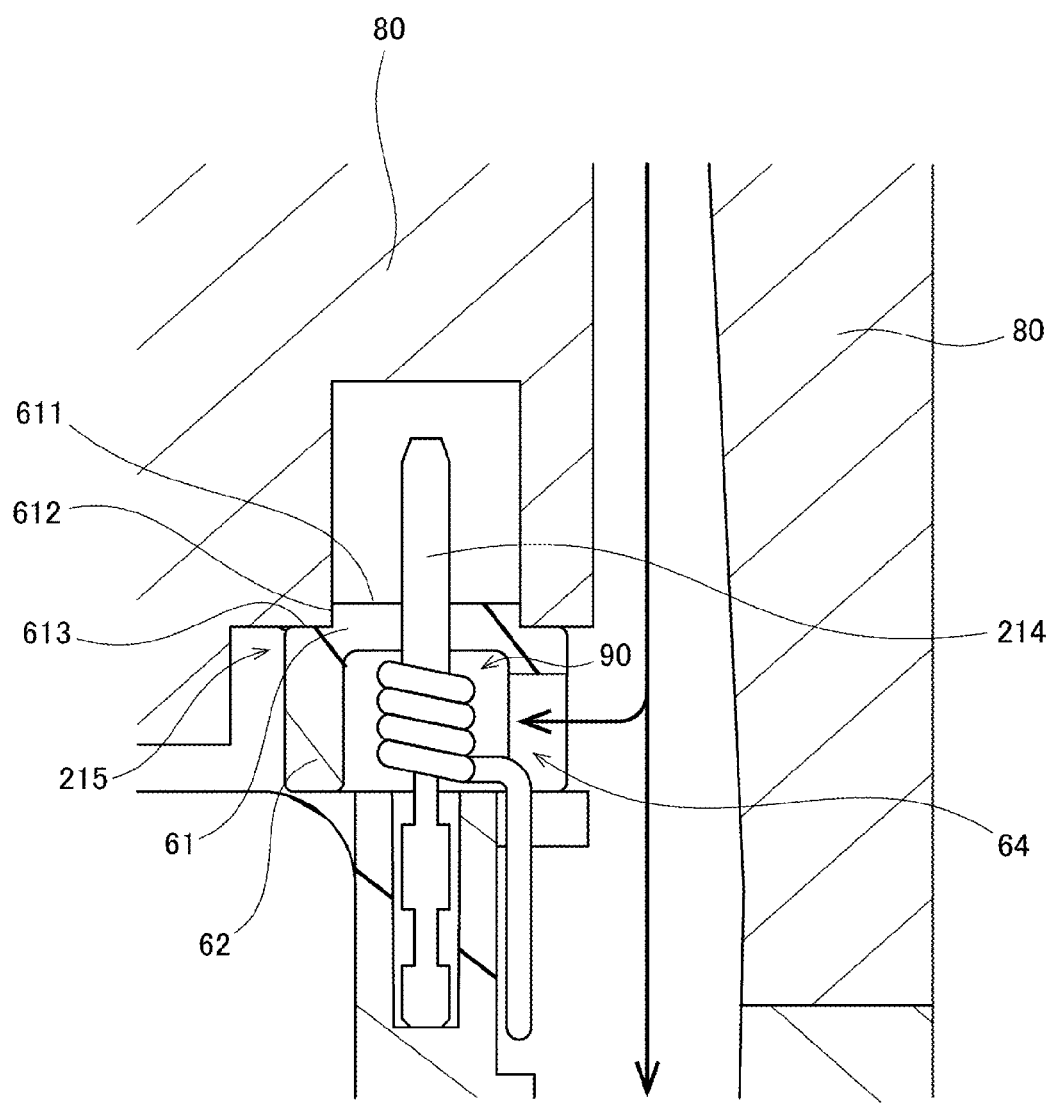
FIG. 9 is a sectional view illustrating an insert-molding process of a casing included in the motor according to the second preferred embodiment of the present invention.

Next, description will be made of an insert molding situation of the casing 22. As described earlier, the casing 22 is a resin-molded article produced by using the stator core 211, the metal terminals 214 and the protection member 215 as inserts. FIG. 9 is a sectional view illustrating an insert molding process of the casing 22 according to the second preferred embodiment. In FIG. 9, a supply route of a molten resin is indicated by arrows.

As shown in FIG. 9, when insert-molding the casing 22, the stator 21, the metal terminals 214 and the protection member 215 are preferably first put into a mold 80. Then, a molten resin is allowed to flow into an internal space of the mold 80. At this time, the mold 80 makes contact with the upper surface of the cover section 61 of the protection member 215. Thus, the molten resin does not flow into the space existing at the upper side of the cover section 61 within the mold 80. Consequently, the portion of each of the metal terminals 214 protruding more upward than the cover section 61 is exposed from the molded casing 22.

As shown in FIGS. 6 and 9, the upper surface of the cover section 61 of the present preferred embodiment preferably includes an inner upper surface 611, a step surface 612, and an outer upper surface 613. The inner upper surface 611 is arranged around the through-hole 610 to extend in a direction perpendicular or substantially perpendicular to the axial direction. The step surface 612 extends downward from the outer periphery of the inner upper surface 611 in a cylindrical or substantially cylindrical shape. The outer upper surface 613 is arranged around the lower end of the step surface 612 to extend in a direction perpendicular or substantially perpendicular to the axial direction.

As shown in FIG. 9, during the molding process of the casing 22, the mold 80 makes contact with the outer upper surface 613 and the step surface 612. The inflow of the molten resin is suppressed in two surfaces, namely the outer upper surface 613 and the step surface 612. Even if the molten resin passes through between the outer upper surface 613 and the mold 80, the step surface 612 and the mold 80 cooperate to prevent the molten resin from flowing into the space existing above the inner upper surface 611. Accordingly, at least the inner upper surface 611 is exposed from the casing 22. That is to say, the molten resin is prevented from flowing toward the vicinities of the metal terminals 214.

Modified Preferred Embodiments

While illustrative preferred embodiments of the present invention have been described above, the present invention is not limited to the aforementioned preferred embodiments.

Figure 10:
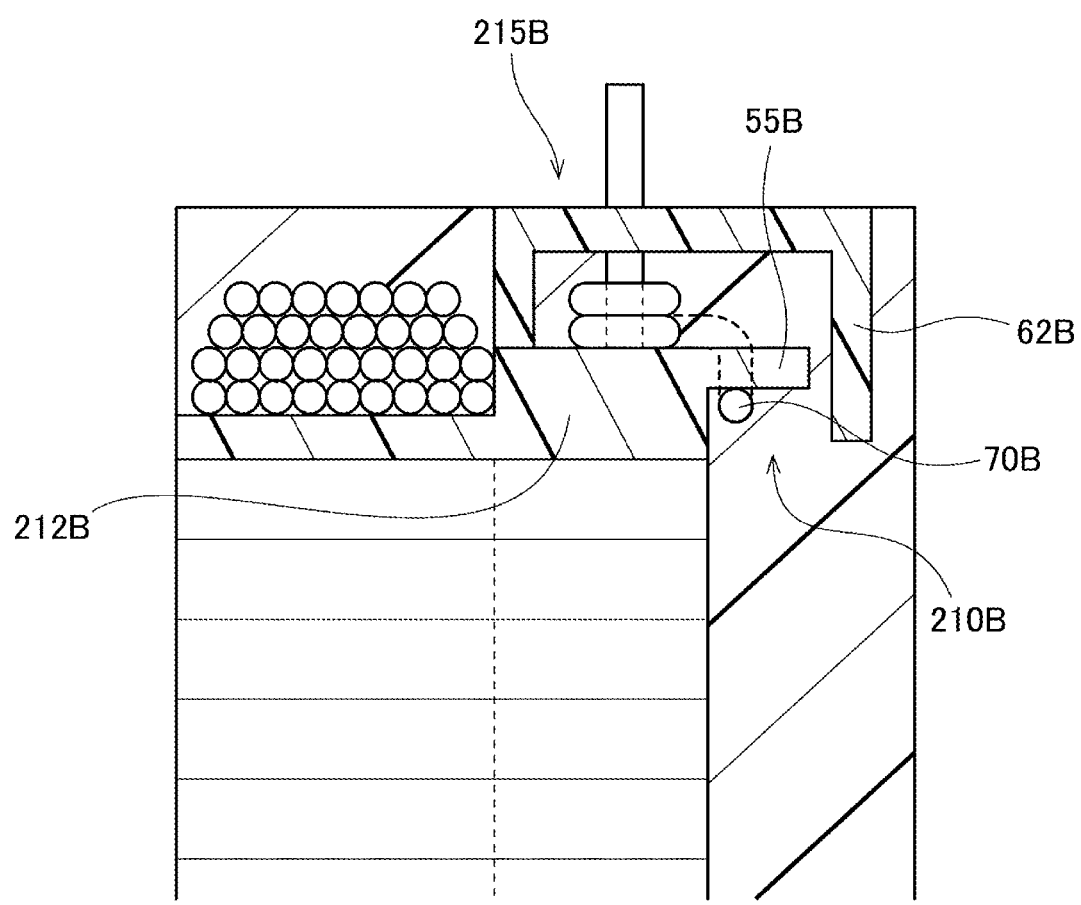
FIG. 10 is a partial vertical sectional view showing a motor according to a modified example of a preferred embodiment of the present invention.

FIG. 10 is a partial vertical sectional view showing a motor according to one example of a modified preferred embodiment of the present invention. In the example shown in FIG. 10, an opening 210B is preferably defined between the post section 62B of the protection member 215B and the outer circumferential surface of the insulator 212B. That is to say, in the example shown in FIG. 10, the opening 210B is opened downward. Even is this structure, if the lead wire 70B is arranged along the guide projections 55B, it is possible to prevent the lead wire 70B from being caught between the insulator 212B and the protection member 215B.

While the first guide groove 71 preferably axially extends in the aforementioned preferred embodiments, the present invention is not limited thereto. For example, one or both of the opening and the metal terminal and the first guide groove may be arranged in different circumferential positions. Moreover, the first guide groove may be defined such that the circumferential position thereof comes closer to the opening as the first guide groove extends upward. This makes it possible to obliquely arrange the lead wire toward the opening. As a result, it becomes possible to reduce the length of the lead wire.

In the aforementioned preferred embodiments, the metal terminal 214 and the lead wire 70 are preferably electrically connected to each other by tying the lead wire 70 around the metal terminal 214. However, a solder or an electrically conductive adhesive may alternatively be used in connecting the metal terminal and the lead wire. Moreover, the metal terminal and the lead wire may also be electrically connected to each other by thermal caulking.

Figure 11:
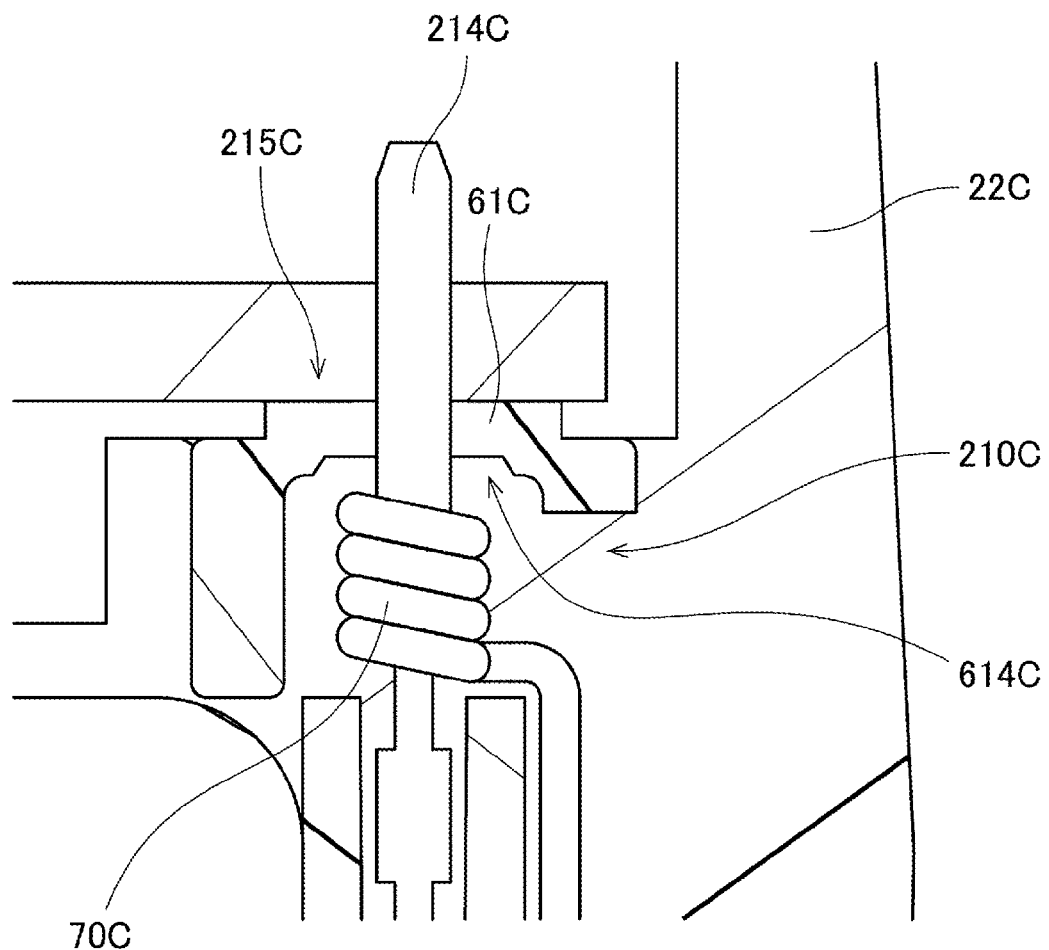
FIG. 11 is a partial vertical sectional view showing a motor according to another modified example of a preferred embodiment of the present invention.

FIG. 11 is a partial vertical sectional view showing a motor according to another example of a modified preferred embodiment of the present invention. In the example shown in FIG. 11, a recess portion 614C is provided on the lower surface of the cover section 61C of the protection member 215C. The recess portion 614C is preferably positioned around the metal terminal 214C. That is to say, the metal terminal 214C penetrates the inside of the recess portion 614C in the up-down direction. At least a portion of the internal space of the recess portion 614C is positioned higher than the opening 210C.

With this configuration, even when the lead wire 70C tied around the metal terminal 214C or the solder adhering to the lead wire 70C protrudes more upward than a designed position, it is possible to prevent the lead wire 70C or the solder from making contact with the lower surface of the cover section 61C. Accordingly, it is possible to prevent the position of the protection member 215C from being shifted upward due to the contact of the lead wire 70C or the solder with the cover section 61C. As a result, the poor molding of the casing 22C is further reduced or prevented.

Even if the recess portion is not provided on the lower surface of the cover section, the upward shift of the protection member can be prevented or significantly reduced as long as a space arranged to avoid strong contact of the lead wire or the solder with the cover section is provided below the cover section. For that reason, it is preferred that at least the portion of the lower surface of the cover section existing around the metal terminal is positioned axially above the opening.

Figure 12:
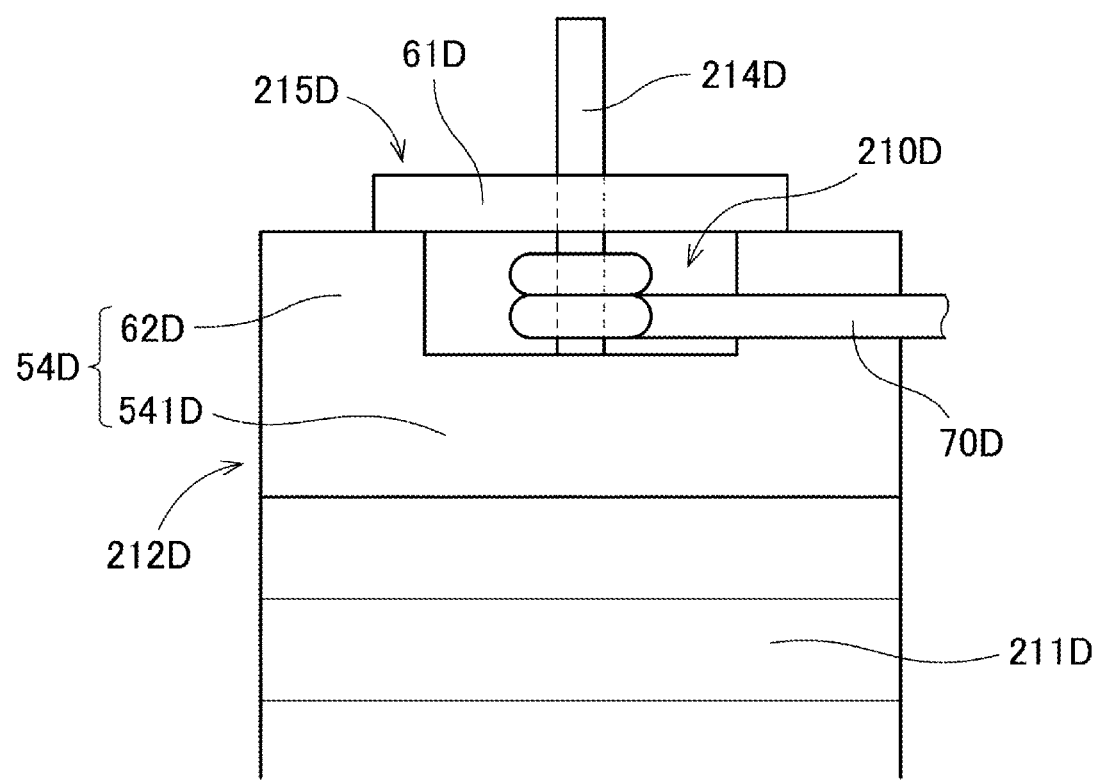
FIG. 12 is a view showing an upper portion of a stator core, an insulator, a metal terminal, a protection member, and a lead wire according to a modified example of a preferred embodiment of the present invention, which are seen from the radial outer side.
Figure 13:
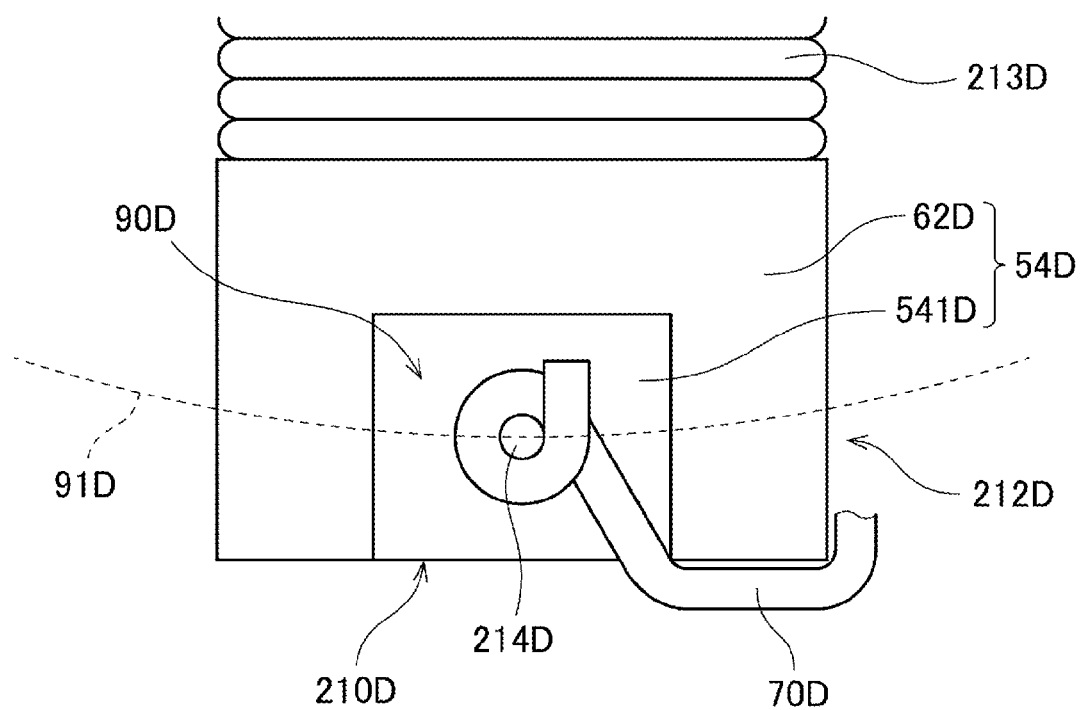
FIG. 13 is a partial plan view of the insulator, the coil, the metal terminal and the lead wire according to the modified example of the preferred embodiment of the present invention shown in FIG. 12.

FIG. 12 is a view showing an upper portion of a stator core 211D, an insulator 212D, a metal terminal 214D, a protection member 215D, and a lead wire 70D according to another example of a further modified preferred embodiment of the present invention, which are seen from the radial outer side. FIG. 13 is a partial plan view of the insulator 212D, the coil 213D, the metal terminal 214D, and the lead wire 70D. In the example shown in FIGS. 12 and 13, a post section 62D is preferably not provided in the protection member 215D but is instead provided in the insulator 212D. That is to say, the protrusion portion 54D of the insulator 212D preferably includes a protrusion body section 541D and a post section 62D. The lower end portion of the metal terminal 214D is attached to the protrusion body section 541D. The post section 62D further protrudes upward from the protrusion body section 541D. In other words, the upper surface of the protrusion body section 541D is positioned lower than the upper surface of the post section 62D. The upper end portion of the post section 62D makes contact with the lower surface of the protection member 215D composed of only a cover section 61D.

In this case, the space surrounded by the protection member 215D, the protrusion body section 541D, and the post section 62D defines an opening 210D through which a lead wire 70D passes. The lead wire 70D extending from a coil 213D passes through the opening 210D and reaches a connection space 90D existing inside the post section 62D. This makes it possible to prevent the lead wire 70D from being caught between post section 62D and the protection member 215D. As a result, it is possible to prevent a shifting in position of the protection member 215D and any resultant poor molding of the casing caused thereby. It is also possible to prevent disconnection of the lead wire 70D which may otherwise be caused by the lead wire 70D being caught between the post section 62D and the protection member 215D.

In the example shown in FIGS. 12 and 13, even if the guide projection is absent, a contact point of the insulator 212D and the protection member 215D is preferably not provided on the route of the lead wire 70D spanning from the coil 213D to the opening 210D. It is therefore possible to omit the guide projection and to prevent the lead wire 70D from being caught between the post section 62D and the protection member 215D.

In the example shown in FIGS. 12 and 13, the opening 210D is provided more radially outward than the metal terminal 214D. That is to say, the opening 210D is positioned at the opposite side from the coil 213D with respect to a cylindrical plane whose radius is equal to the distance from the center axis to the metal terminal 214D. Thus, the end portion of the lead wire 70D can be led out from the coil 213D to the radial outer side of the protrusion portion 54D and, then, can be introduced into the connection space 90D through the opening 210D. This makes it possible to prevent or significantly reduce bending of the lead wire 70D.

In the example shown in FIGS. 12 and 13, the protection member 215D can be made of only the cover section 61D. This makes it possible to reduce the axial dimension of the protection member 215D. The contact point of the metal terminal 214D and the lead wire 70D is positioned lower than the upper end of the post section 62D. In this way, the metal terminal 214D and the lead wire 70D can be connected to each other in a position lower than the upper end of the insulator 212D. It is therefore possible to reduce the axial dimension of the motor.

Figure 14:
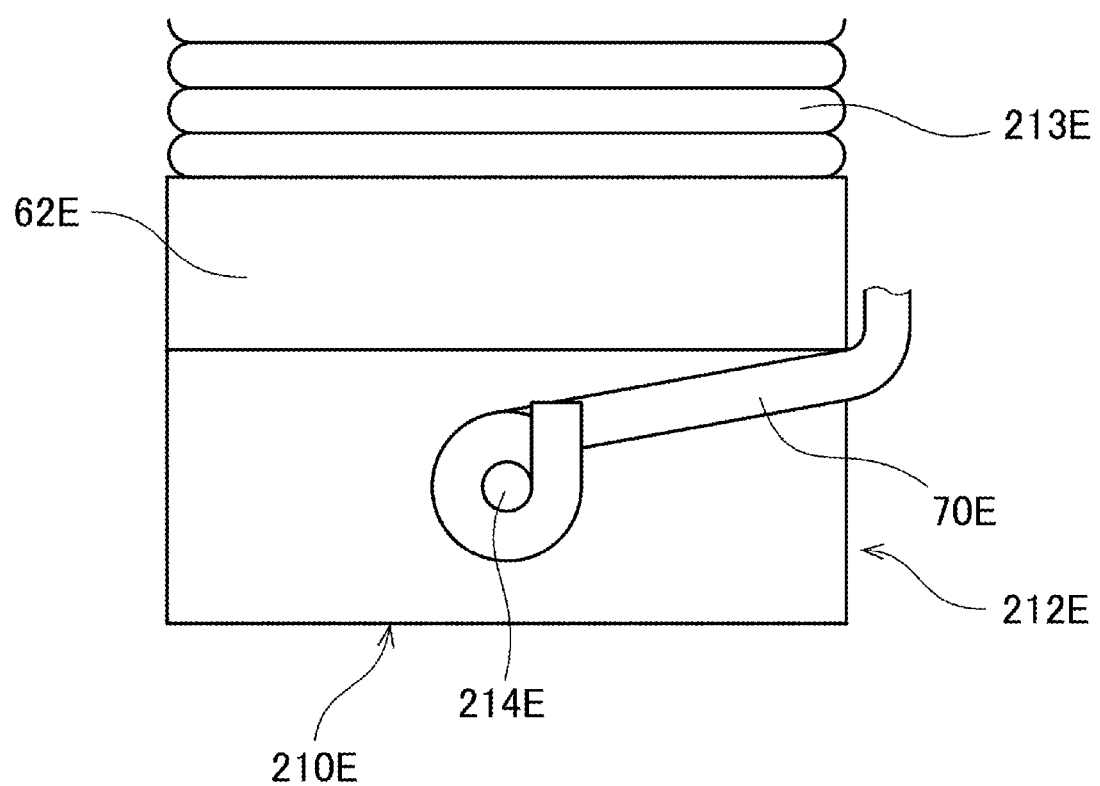
FIG. 14 is a partial plan view showing an insulator, a coil, a metal terminal, and a lead wire according to a further modified example of a preferred embodiment of the present invention.

FIG. 14 is a partial plan view showing an insulator 212E, a coil 213E, a metal terminal 214E and a lead wire 70E according to a still further modified example. In the example shown in FIG. 14, a post section 62E is arranged only at the radial inner side of the metal terminal 214E. This makes it possible to widen the opening 210E as compared with the aforementioned preferred embodiments. Moreover, the contact area of the post section 62E and the protection member becomes smaller. It is therefore possible to more reliably prevent the lead wire 70E from being caught between the post section 62E and the protection member.

Figure 15:
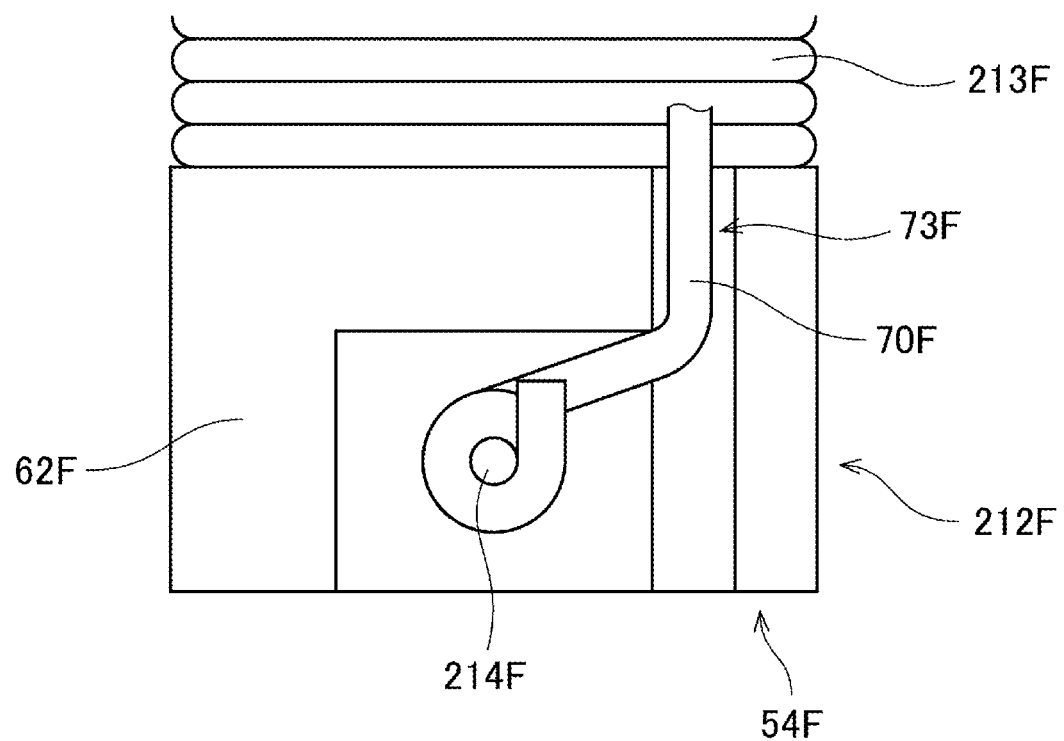
FIG. 15 is a partial plan view showing an insulator, a coil, a metal terminal, and a lead wire according to a still further modified example of a preferred embodiment of the present invention.

FIG. 15 is a partial plan view showing an insulator 212F, a coil 213F, a metal terminal 214F, and a lead wire 70F according to a yet still further modified preferred embodiment of the present invention. In the example shown in FIG. 15, a third guide groove 73F is preferably provided in the insulator 212F. The third guide groove 73F radially extends on the upper surface of the protrusion portion 54F. In the example shown in FIG. 15, the third guide groove 73F radially extends through the post section 62F of the insulator 212F. A portion of the lead wire 70F extending from the coil 213F is arranged in the third guide groove 73F. This makes it possible to further prevent or reduce circumferential position shift of the lead wire 70F. Accordingly, it is possible to prevent the lead wires 70F led from the adjoining coils 213F from making contact with each other. Since the route of the lead wire 70F is further restricted, it is possible to more reliably prevent the lead wire 70F from being caught between the insulator 212F and the protection member.

In the aforementioned preferred embodiments, description has been made of the so-called inner-rotor-type motor 1 in which the magnets 322 are arranged radially inward of the stator 21. However, the motor of the present invention may alternatively be a so-called outer-rotor-type motor in which magnets are arranged radially outward of a stator.

In case of the outer-rotor-type motor, a plurality of teeth protrudes radially outward from a core-back. Thus, the protrusion portions 54 are arranged radially inward of the coils 213. In this case, it is preferred that the guide projections 55 protrude from the radial inner surfaces of the protrusion portions 54. It is also preferred that the opening is provided radially inward of the metal terminal.

Regardless of whether the motor is an inner rotor type or an outer rotor type, the guide projection may protrude from any of the radial outer side surface, the radial inner side surface, the circumferential side surface and the axial end surface of the protrusion portion.

In the aforementioned preferred embodiments and modifications thereof, the number of the protrusion portions 54 extending from one insulator 212 is preferably three. However, the number of the protrusion portions extending from one insulator may be one, two, or four or more.

The specific shapes of the respective members may differ from the shapes shown in the respective figures of the subject application. The respective elements included in the preferred embodiments and the modified examples described above may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
   a stationary unit; and
   a rotary unit rotatably supported to rotate about a center axis extending in an axial direction; wherein
   the stationary unit includes a ring-shaped core-back, a plurality of teeth, a resin insulator, a coil, a metal terminal, a resin protection member, and a casing;
   the core-back is arranged to surround the center axis;
   the teeth protrude radially inward or radially outward from the core-back;
   the insulator includes a first insulating portion, a second insulating portion, a third insulating portion, and a protrusion portion;
   the first insulating portion is arranged to cover axial opposite end surfaces and circumferential opposite surfaces of the teeth;
   the second insulating portion is arranged to cover at least a portion of an upper surface of the core-back;
   the third insulating portion is arranged to cover at least a portion of a lower surface of the core-back; and
   the protrusion portion protrudes upward from the second insulating portion;
   the coil is defined by a lead wire wound around the teeth through the first insulating portion;
   the metal terminal is attached to the protrusion portion and provided with an upper end portion positioned axially above the protrusion portion, and the metal terminal is electrically connected to an end portion of the lead wire;
   the protection member is arranged to cover a portion of the metal terminal;
   the casing is a molded resin article in which the core-back, the teeth, the insulator, the coil, the metal terminal, and the protection member are arranged as inserts;
   the protection member includes a cover section through which the metal terminal penetrates in the axial direction;
   the upper end portion of the metal terminal is positioned axially above an upper surface of the cover section;
   the protection member or the insulator includes a post section positioned below the cover section and arranged to axially extend in a portion of a surrounding of the metal terminal;
   a connection space within which a connection point of the metal terminal and the lead wire is disposed is provided between the cover section and the insulator and at the side of the metal terminal from the post section;
   the post section includes an opening;
   the lead wire is arranged to reach the connection space through the opening; and
   the opening is at least larger in size than a cross section of the lead wire.

2. The motor of claim 1, wherein the opening is positioned at a side opposite from the coil with respect to a cylindrical plane whose radius is equal or substantially equal to a distance from the center axis to the metal terminal.

3. The motor of claim 1, wherein the protection member includes a through-hole through which the metal terminal penetrates, and the protection member includes a surface which defines the through-hole of the protection member and surrounds an entire circumference of the metal terminal.

4. The motor of claim 1, wherein at least a portion of the upper surface of the cover section is exposed from a surface of the casing.

5. The motor of claim 1, wherein the protection member includes a post section extending downward from a lower surface of the cover section, the post section includes a lower end portion making contact with an upper end portion of the protrusion portion, and the opening is a space surrounded by the protrusion portion, the cover section, and the post section.

6. The motor of claim 1, wherein the protrusion portion includes a protrusion body section to which the metal terminal is attached and the post section protruding upward from the protrusion body section, the protrusion body section includes an upper surface positioned lower than an upper surface of the post section, an upper end portion of the post section contacting the protection member, and the opening is a space surrounded by the protection member, the protrusion body section, and the post section.

7. The motor of claim 5, wherein the insulator includes a guide projection arranged to protrude from the protrusion portion, the lead wire is arranged to change a direction thereof to extend upward along the guide projection from below the guide projection and to reach the connection space through the opening, and the lead wire is connected to the metal terminal in the connection space.

8. The motor of claim 7, wherein the guide projection is positioned lower than the opening.

9. The motor of claim 7, wherein a circumferential position of the guide projection at the side of the lead wire or a circumferential position of a portion of a surface of the guide projection making contact with the lead wire at least partially overlaps a circumferential position of the opening.

10. The motor of claim 7, wherein the guide projection protrudes from a radial inner surface or a radial outer surface of the protrusion portion which is opposite from the coil.

11. The motor of claim 7, wherein the guide projection of the insulator includes a pair of guide projections, and a portion of the lead wire is arranged in a first guide groove positioned between the guide projections.

12. The motor of claim 11, wherein one or both of the opening and the metal terminal, and the first guide groove are at least partially arranged in corresponding circumferential position, and the first guide groove extends in the axial direction.

13. The motor of claim 11, wherein one or both of the opening and the metal terminal, and the first guide groove are arranged in different circumferential positions, and the first guide groove extends upward so as to be located closer to the opening.

14. The motor of claim 11, wherein the first guide groove has a width which becomes narrower closer to the metal terminal.

15. The motor of claim 11, wherein the first guide groove includes an outer groove whose width becomes narrower closer to the metal terminal and an inner groove further depressed toward the metal terminal from an end of the outer groove existing at a side of the metal terminal, and a portion of the lead wire is arranged in the inner groove.

16. The motor of claim 7, wherein the protection member includes a cutout section through which inside and outside of the post section radially communicate with each other, and the cutout section defines the opening.

17. The motor of claim 7, wherein a portion of the lead wire is arranged in a second guide groove positioned between the second insulating portion and the guide projection.

18. The motor of claim 6, wherein at least a portion of post section is positioned radially inward of the metal terminal, and a connection point of the metal terminal and the lead wire is positioned lower than an upper end of the post section.

19. The motor of claim 18, wherein the post section extends over a range spanning from a radial inner side of the metal terminal to circumferential opposite sides of the metal terminal.

20. The motor of claim 3, wherein the metal terminal is press-fitted to the through-hole.

21. The motor of claim 1, wherein the insulator further includes a third guide groove radially extending on an upper surface of the protrusion portion, and a portion of the lead wire is arranged in the third guide groove.

22. The motor of claim 1, wherein the protrusion portion of the insulator includes a plurality of protrusion portions arranged in a circumferentially spaced-apart relationship with one another.

23. The motor of claim 1, wherein an end portion of the lead wire is tied around the metal terminal within the connection space.

24. The motor of claim 1, wherein the cover section includes an inner upper surface arranged around the metal terminal to extend in a direction perpendicular or substantially perpendicular to the axial direction, a cylindrical step surface extending downward from an outer periphery of the inner upper surface and an outer upper surface arranged around a lower end of the step surface to extend in a direction perpendicular or substantially perpendicular to the axial direction, and at least the inner upper surface is exposed from the casing.

25. The motor of claim 1, wherein at least a portion of a lower surface of the cover section provided around the metal terminal is positioned above the opening.

26. The motor of claim 25, wherein the protection member includes a recess portion defined on the lower surface of the cover section, the recess portion is positioned around the metal terminal, and at least a portion of a space is provided within the recess portion positioned above the opening.

27. The motor of claim 1, wherein the metal terminal includes a plurality of metal terminals, and the protection member includes a plurality of cap portions arranged to cover a portion of each of the metal terminals and a connecting portion arranged to connect the cap portions to each other.

28. The motor of claim 27, wherein the core-back includes a plurality of core pieces arranged in a circumferential direction, the teeth are arranged to extend from the respective core pieces, and the metal terminals are positioned above one of the core pieces.

29. The motor of claim 27, wherein the core-back includes a plurality of core pieces arranged in a circumferential direction, the teeth are arranged to extend from the respective core pieces, and each of the metal terminals is positioned above each of the core pieces.

30. The motor of claim 1, wherein the stationary unit further includes a circuit board on which a circuit arranged to supply a drive current to the coil is mounted, and the metal terminals and the circuit are electrically connected to each other outside the casing.

* * * * *